(12) United States Patent
Choi et al.

(10) Patent No.: US 11,735,765 B2
(45) Date of Patent: Aug. 22, 2023

(54) SOLID ION CONDUCTOR, SOLID ELECTROLYTE INCLUDING THE SOLID ION CONDUCTOR, ELECTROCHEMICAL DEVICE INCLUDING THE SOLID ELECTROLYTE, AND METHOD OF PREPARING THE SOLID ION CONDUCTOR

(71) Applicant: Samsung Electronics Co., Ltd., Suwon-si (KR)

(72) Inventors: Wonsung Choi, Hwaseong-si (KR); Jusik Kim, Hwaseong-si (KR); Gabin Yoon, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 78 days.

(21) Appl. No.: 17/412,400

(22) Filed: Aug. 26, 2021

(65) Prior Publication Data
US 2022/0223904 A1   Jul. 14, 2022

(30) Foreign Application Priority Data
Jan. 8, 2021   (KR) .......................... 10-2021-0002583

(51) Int. Cl.
*H01M 10/0562* (2010.01)
*H01M 12/08* (2006.01)
(Continued)

(52) U.S. Cl.
CPC ....... *H01M 10/0562* (2013.01); *H01M 4/366* (2013.01); *H01M 4/62* (2013.01);
(Continued)

(58) Field of Classification Search
CPC .... H01M 10/0562; H01M 4/366; H01M 4/62; H01M 12/02; H01M 12/08; H01M 2300/008; H01M 10/052; C01G 25/006
See application file for complete search history.

(56) References Cited

U.S. PATENT DOCUMENTS 6,402,795 B1   6/2002   Chu et al.
6,485,622 B1   11/2002   Fu
(Continued)

FOREIGN PATENT DOCUMENTS

| CN | 109775744 A | 5/2019 |
| CN | 109950617 A | 6/2019 |

(Continued)

OTHER PUBLICATIONS

US 20220255125 A1 is the English equivalent for WO 2021024783 A1.*
(Continued)

*Primary Examiner* — Stewart A Fraser
(74) *Attorney, Agent, or Firm* — Cantor Colburn LLP

(57) ABSTRACT

A solid ion conductor, a solid electrolyte and an electrochemical device including the solid ion conductor, and a method of preparing the solid ion conductor are disclosed. The solid ion conductor may include a compound represented by Formula 1:

$$Li_a M_b M'_c Zr_d X_e \qquad \text{Formula 1}$$

wherein, M is one or more metals of Na, K, Cs, Cu, or Ag, and having an oxidation state of +1, M' is one or more lanthanide metals having an oxidation state of +3 and a crystal ionic radius of about 104 picometers to about 109 picometers, X is one or more halogen elements, $1<a<3.5$, $0≤b<1$, $0<c<1.5$, $0<d<1.5$, and $0<e<7$.

21 Claims, 7 Drawing Sheets

(51) Int. Cl.
   *H01M 4/62*  (2006.01)
   *H01M 4/36*  (2006.01)
   *H01M 12/02* (2006.01)

(52) U.S. Cl.
   CPC ........... *H01M 12/02* (2013.01); *H01M 12/08* (2013.01); *H01M 2300/008* (2013.01)

(56) References Cited

U.S. PATENT DOCUMENTS

| | | | |
|---|---|---|---|
| 7,901,658 | B2 | 3/2011 | Weppner et al. |
| 8,828,580 | B2 | 9/2014 | Visco et al. |
| 2015/0044575 | A1 | 2/2015 | Kawaji et al. |
| 2018/0006326 | A1 | 1/2018 | O'Neill et al. |
| 2018/0269526 | A1* | 9/2018 | Takeuchi ............. H01M 10/052 |
| 2019/0088995 | A1 | 3/2019 | Asano et al. |
| 2020/0075993 | A1 | 3/2020 | Ling et al. |
| 2020/0328459 | A1 | 10/2020 | Sakai et al. |
| 2020/0328468 | A1 | 10/2020 | Sakaida et al. |
| 2020/0335817 | A1 | 10/2020 | Asano et al. |
| 2021/0098824 | A1 | 4/2021 | Nishio et al. |
| 2021/0098825 | A1* | 4/2021 | Sakaida ............ H01M 10/0525 |
| 2021/0126284 | A1 | 4/2021 | Sakaida et al. |
| 2022/0006116 | A1 | 1/2022 | Choi et al. |
| 2022/0149426 | A1 | 5/2022 | Yoon et al. |
| 2022/0149430 | A1 | 5/2022 | Choi et al. |
| 2022/0216507 | A1 | 7/2022 | Sun et al. |
| 2022/0223904 | A1 | 7/2022 | Choi et al. |
| 2022/0255125 | A1* | 8/2022 | Suzuki ..................... H01B 1/06 |

FOREIGN PATENT DOCUMENTS

| | | | | |
|---|---|---|---|---|
| EP | 3736897 | A1 | 11/2020 | |
| EP | 3863025 | A1 | 8/2021 | |
| EP | 3905273 | A1 | 11/2021 | |
| EP | 3905277 | A1 | 11/2021 | |
| JP | 2006244734 | A | 9/2006 | |
| KR | 101602416 | A | 3/2016 | |
| WO | 2015079509 | A1 | 6/2015 | |
| WO | 2019004714 | A1 | 1/2019 | |
| WO | 2019135319 | A1 | 7/2019 | |
| WO | 2019135320 | A1 | 7/2019 | |
| WO | 2019135348 | A1 | 7/2019 | |
| WO | 2020070956 | A1 | 4/2020 | |
| WO | 2020070957 | A1 | 4/2020 | |
| WO | 2020070958 | A1 | 4/2020 | |
| WO | WO-2020070956 | A1 * | 4/2020 | ............... H01B 1/06 |
| WO | 2020220697 | A1 | 11/2020 | |
| WO | WO-2021024783 | A1 * | 2/2021 | ......... H01M 10/0525 |
| WO | 2021070595 | A1 | 4/2021 | |
| WO | 2021131716 | A1 | 7/2021 | |
| WO | 2021217045 | A1 | 10/2021 | |
| WO | 2022018946 | A1 | 1/2022 | |
| WO | 2022018952 | A1 | 1/2022 | |
| WO | 2022019098 | A1 | 1/2022 | |
| WO | 2022019099 | A1 | 1/2022 | |

OTHER PUBLICATIONS

US 20210098825 A1 is the English equivalent for WO 2020070956 A1.*

Dongsu Park et al., "Theoretical Design of Lithium Chloride Superionic Conductors for All-Solid-State High-Voltage Lithium-Ion Batteries," ACS Applied Materials & Interfaces, Jul. 9, 2020, pp. 34806-34814, vol. 12.

Ionic radius, Wikipedia, pp. 1-10, Nov. 3, 2021, https://en.wikipedia.org/wiki/Ionic_radius.

Kern-Ho Park et al., "High-Voltage Superionic Halide Solid Electrolytes for All-Solid-State Li-Ion Batteries," ACS Energy Letters, Jan. 9, 2020, pp. 533-539, vol. 5.

Shuo Wang et al., "Lithium Chlorides and Bromides as Promising Solid-State Chemistries for Fast Ion Conductors with Good Electrochemical Stability," Angew. Chemie, May 15, 2019, pp. 8123-8127, vol. 131.

Asano et al., "Solid Halide Electrolytes with High Lithium-Ion Conductivity for Application in 4 V Class Bulk-Type All-Solid-State Batteries", Advanced Materials, vol. 30, 2018, 1803075.

Shuo Wang et al., "Lithium Chlorides and Bromides as Promising Solid-State Chemistries for Fast Ion Conductors with Good Electrochemical Stability," Communications, Li-Ion Batteries, May 15, 2019, pp. 8039-8043, vol. 58, With Supporting Information.

Tomita et al., "New Lithium Ion Conductor Li3InBr6Studied by 7Li NMR", Chemistry Letters, The Chemical Society of Japan, 1998, 223-224.

Tomita et al., "Substitution effect of ionic conductivity in lithium ion conductor, LI3INBR6-xCLx", Solid State Ionics, 179, 2008, 867-870.

Tomita Yasumasa et al., "New Lithium Ion Conductor Li3InBr6 Studied by 7Li NMR," Chemistry Letters 1998, pp. 223-224, vol. 27, No. 3.

Xiaona Li et al., "Air-stable Li3InCl6 electrolyte with high voltage compatibility for all-solid-state batteries," Energy & Environmental Science, Aug. 28, 2019, pp. 1-7, Issue 9.

Yasumasa Tomita et al., "Synthesis and Characterization of Lithium Ion Conductors, Li3InBr6 and Its Substituted Compounds," Defect and Diffusion Forum, Sep. 30, 2005, pp. 17-26, vols. 242-244.

* cited by examiner

SOLID ION CONDUCTOR, SOLID ELECTROLYTE INCLUDING THE SOLID ION CONDUCTOR, ELECTROCHEMICAL DEVICE INCLUDING THE SOLID ELECTROLYTE, AND METHOD OF PREPARING THE SOLID ION CONDUCTOR

CROSS-REFERENCE TO RELATED APPLICATION

This application claims priority to Korean Patent Application No. 10-2021-0002583, filed on Jan. 8, 2021, in the Korean Intellectual Property Office, and all the benefits accruing therefrom under 35 U.S.C. § 119, the content of which is incorporated by reference herein in its entirety.

BACKGROUND

1. Field

The present disclosure relates to a solid ion conductor, a solid electrolyte and an electrochemical device including the solid ion conductor, and a method of preparing the solid ion conductor.

2. Description of the Related Art

An electrochemical device, for example, an all-solid-state secondary battery, uses a lithium metal or the like having high energy density in a negative electrode to provide high energy density and uses a solid ion conductor as an electrolyte for safe operation.

As solid ion conductors, oxide-based solid ion conductors and sulfide-based solid ion conductors have been widely studied. Although oxide-based solid ion conductors have excellent chemical stability, the ionic conductivity and moldability thereof are poorer than those of sulfide-based solid ion conductors. Sulfide-based solid ion conductors have high ionic conductivity and excellent moldability but undesirable gas can be generated as a result of reaction with water.

Therefore, there is a need for a solid ion conductor having excellent ionic conductivity and charging and discharging characteristics, a solid electrolyte including the solid ion conductor and an electrochemical device including the solid ion conductor, and a method of preparing the solid ion conductor.

SUMMARY

Provided is a solid ion conductor having excellent ionic conductivity and charging and discharging characteristics.

Provided is a solid electrolyte including the solid ion conductor.

Provided is an electrochemical device including the solid ion conductor.

Provided is a method of preparing the solid ion conductor.

Additional aspects will be set forth in part in the description which follows and, in part, will be apparent from the description, or may be learned by practice of the presented embodiments of the disclosure.

According to an aspect, provided is a solid ion conductor including a compound represented by Formula 1:

$$Li_aM_bM'_cZr_dX_e.$$ 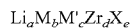 Formula 1 wherein in Formula 1,

M is one or more metals of Na, K, Cs, Cu, or Ag, and having an oxidation state of +1, M' is one or more lanthanide metals having an oxidation state of +3 and a crystal ionic radius of about 104 picometers to about 109 picometers, X is one or more halogen elements, $1<a<3.5$, $0 \leq b<1$, $0<c<1.5$, $0<d<1.5$, and $0<e<7$.

According to another aspect, provided is a solid electrolyte layer including a layer comprising the solid ion conductor.

Also provided is a solid electrolyte including the solid ion conductor and optionally an oxide solid ion conductor or a sulfide solid ion conductor.

According to still another aspect, provided is an electrochemical device comprising: a positive electrode layer, a negative electrode layer, and a solid electrolyte layer disposed between the positive electrode layer and the negative electrode layer; wherein one or more of the positive electrode layer, the negative electrolyte layer, or the solid electrolyte layer comprises the solid ion conductor.

According to still another aspect, provided is a method of preparing the solid ion conductor, the method including:

mechanically milling a solid ion conductor-forming precursor to form a solid ion conductor-forming precursor mixture; and molding the solid ion conductor-forming precursor mixture to prepare a solid ion conductor comprising a compound represented by Formula 1:

$$Li_aM_bM'_cZr_dX_e.$$ 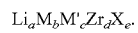 Formula 1 wherein in Formula 1,

M is one or more metals of Na, K, Cs, Cu, or Ag, and having an oxidation number of +1, M' is one or more lanthanide metals having an oxidation state of +3 and a crystal ionic radius of about 104 picometers to about 109 picometers, X is one or more halogen elements, $1<a<3.5$, $0 \leq b<1$, $0<c<1.5$, $0<d<1.5$, and $0<e<7$.

Also disclosed is a protected positive electrode layer, including: a positive electrode layer; and a protective film comprising the solid ion conductor on the positive electrode layer.

Also disclosed is a protected negative electrode layer, including a negative electrode layer; and a protective film comprising the solid ion conductor on the negative electrode layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
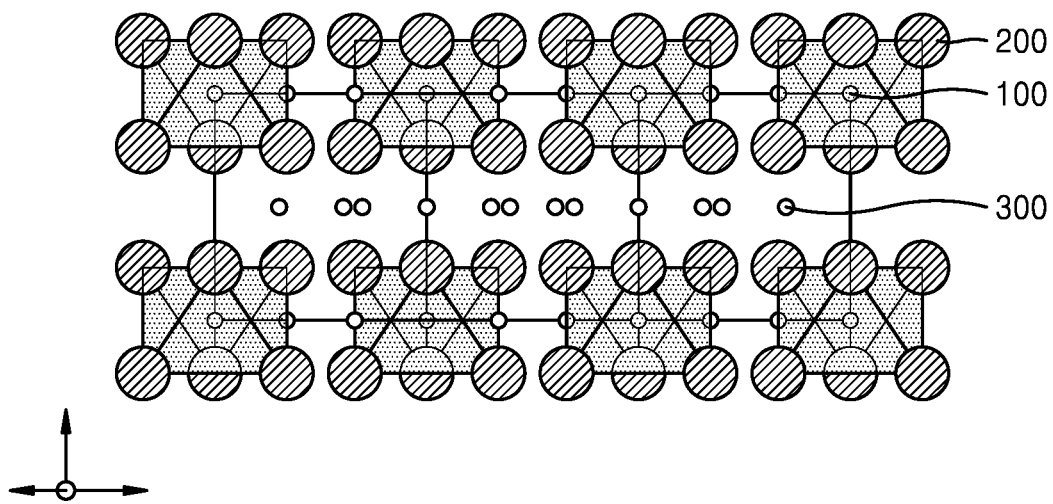
FIG. 1 is a schematic view showing an embodiment of a crystal structure of the solid ion conductor.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain various aspects. As used herein, the term "and/or" includes any and all combinations of one or more of the associated listed items.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a solid ion conductor according to embodiments of the present disclosure, a solid electrolyte including the solid ion conductor, an electrochemical device including the solid electrolyte, and a method of preparing the solid ion conductor, according to embodiments of the present disclosure, will be described in detail with reference to the appended drawings. The following description of various embodiments of the present disclosure is provided for illustrative purpose only and not for limiting, and the present invention is only defined by the scope of the claims to be described later.

The expression "at least one type," "one or more types", or "one or more" as used herein when preceding a list of elements modifies the entire list of elements and does not modify the individual elements of the list. The term "combination" as used herein includes a mixture, an alloy, a reaction product, and the like, unless otherwise specified.

As used herein, the terms "comprises", "comprising," "includes," "including," "contains," or "containing" in relation to an element does not preclude other components but may further include another element, unless otherwise specified.

The terms "first," "second," or the like as used herein do not indicate order, quantity or importance, and are used to distinguish one element from another. Unless otherwise indicated herein or unless the context clearly indicates otherwise, it is construed that a singular expression encompasses a plural expression, and vice versa. Unless otherwise specified, the expression "or" as used herein means "and/or."

In relation to embodiments, the expressions "an embodiment," "embodiments," and the like throughout the present specification means that a stated specific element may be included in at least one embodiment, and may be present or not in other embodiments. It will be understood that described elements may be combined in any suitable manner in various embodiments.

Crystal ionic radius refers to the size of an atom's ion in a crystal lattice. Crystal ionic radius can be measured by X-ray diffraction using CuKα radiation.

The lanthanide metals include the 15 rare earth metals from lanthanum having an atomic number of 57 to lutetium having an atomic number of 71. The lanthanide metals may be, for example, one or more of Ce, Pr, Nd, Pm, Sm, Eu, Gd, Tb, Dy, Ho, Er, Tm, Yb, or Lu.

Room temperature can be, for example, about 20° C. to about 25° C.

Unless otherwise defined, all terms (including technical and scientific terms) used herein have the same meaning as commonly understood by one of ordinary skill in the art to which this specification belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

All cited patents, patent applications, and other references are incorporated herein by reference in their entirety. However, in the event of any conflict or inconsistency between terms used herein and terms of the cited references, the terms used in this specification take precedence over the terms of the cited references. While specific embodiments and implementations have been described, alternatives, modifications, variations, improvements, and substantial equivalents that are or may be presently unforeseen may arise to the applicant or a person skilled in the art. Accordingly, the appended claims as appended and as they may be amended are intended to embrace all such alternatives, modifications, variations, improvements, and substantial equivalents.

Solid ion conductors have been used as solid electrolytes. Solid electrolytes often do not have higher ionic conductivity than liquid electrolytes. Therefore, when such solid electrolytes are used in an electrochemical device, the electrochemical device may have poor charging and discharging characteristics, in particular at room temperature.

Among the solid ion conductors, extensive research has been conducted on sulfide-based solid ion conductors and oxide-based solid ion conductors. Although sulfide-based solid ion conductors have excellent ionic conductivity, their chemical stability and electrochemical stability may deteriorate due to gas generation. Oxide-based solid ion conductors have excellent chemical stability, however, poor moldability and low ionic conductivity thereof may impair charging and discharging characteristics when the oxide-based solid ion conductors are used in electrochemical devices. Thus, to compensate for these drawbacks, it is suggested to crystallize the oxide-based solid ion conductors at a high temperature above 1000° C.

Recently, research into halogen-based solid electrolytes as solid ion conductors has been conducted. Halogen-based solid electrolytes may be molded by pressurizing without generating gas. Among these halogen-based solid electrolytes, $Li_3ZrCl_6$ with Zr as a central metal exhibits high ionic conductivity. The $Li_3ZrCl_6$ solid electrolyte has been used in the positive electrode of an electrochemical device.

However, to further improve the performance of the electrochemical device, there is still a demand for improved ionic conductivity to provide improved charging and discharging characteristics.

To compensate for the limitations of ionic conductivity and/or charging/discharging characteristics, the present inventors have suggested a solid ion conductor, a solid electrolyte including the solid ion conductor, an electrochemical device including the solid ion conductor, and a method of preparing the solid ion conductor.

Hereinafter, a solid ion conductor, a solid electrolyte including the solid ion conductor, an electrochemical device including the solid ion conductor, and a method of preparing the solid ion conductor will be described in detail.

Solid Ion Conductor

A solid ion conductor according to an embodiment includes a compound represented by Formula 1 below:

 Formula 1 wherein in Formula 1,

M may be one or more metals of Na, K, Cs, Cu, or Ag, and having an oxidation state of +1, M' may be one or more lanthanide metals having an oxidation state of +3 and a crystal ionic radius of about 104 picometers (pm) to about 109 picometers, X may be one or more halogen elements, and $1<a<3.5$, $0 \leq b<1$, $0<c<1.5$, $0<d<1.5$, and $0<e<7$.

For example, M' may be one or more of Ho, Dy, Tb, Eu, or Gd.

For example, $1<a<3$ may be satisfied. In an aspect, $1.1<a<2.9$, $1.5<a<2.7$, or $2<a<2.5$.

For example, $0 \leq b<0.5$ may be satisfied. In an aspect, $0<b<0.5$, $0.05<b<0.4$, or $0.1<b<0.3$.

For example, $0<c<1.2$ may be satisfied. In an aspect, $0.1<c<1.1$, $0.2<c<1$, or $0.3<c<0.9$.

The compound represented by Formula 1 may be a halogen-based solid ion conductor with Zr having an oxidation state of +4 as a central metal. A Zr site or/and Li site can be substituted with one or more lanthanide metals having an oxidation state of +3 and a crystal ionic radius of about 104 pm to about 109 pm or/and one or more metals of Na, K, Cs, Cu, or Ag, and having an oxidization state of +1. As compared with a halogen-based solid ion conductor with a metal having an oxidation state of +3 as a central element, for example, $Li_3(M1)X_6$ (wherein M1 is a metal having an oxidation state of +3), the solid ion conductor according to one or more embodiments of the disclosure may have increased mobility of lithium ions and reduced activation energy, due to the possible presence of lithium vacancies between layers, and also excellent ionic conductivity. When the solid ion conductor is used in an electrochemical device, the electrochemical device may have excellent discharge capacity and lifespan characteristics.

The reason for the compound having excellent ionic conductivity and excellent discharge capacity and lifespan characteristics as compared with a halogen-based solid ion conductor with a metal having an oxidation state of +3 as a central metal will be described in detail below. However, this is only for illustrative purposes, and the scope of the present disclosure is not limited to the following description.

FIG. 1 is a schematic diagram illustrating an embodiment of a crystal structure of a solid ion conductor compound represented by Formula 1.

As shown in FIG. 1, a solid ion conductor compound according to an embodiment has a distorted rock-salt type crystal structure. A rock-salt-type crystal structure is a type of ionic crystal structure in which the cations have a face-centered cubic arrangement, with anions occupying all the octahedral holes. It can also be described as a fcc array of anions with cations in the octahedral holes. In a distorted rock-salt-type crystal structure, one or more atoms depart from their positions in an ideal rock-salt-type crystal structure. The compound includes octahedra (e.g., $ZrCl_6^{2-}$) in which $Zr^{+4}$ (100 in FIG. 1) is a central metal coordinated by six chlorine ions (Cl⁻) 200 in each octahedron. $Zr^{+4}$ can be substituted with cations of one or more lanthanide metals (M') having an oxidation state of +3 and a crystal ionic radius of about 104 pm to about 109 pm. The compound has a layered crystal structure in which Li⁺ ions are located around the $ZrCl_6^{2-}$ octahedra, and some of the Li⁺ ions are substituted with cations of one or more metals (M) other than lithium having an oxidation state of +1. Li$^+$ cations may form an ionic bond with Cl$^-$ forming LiCl depending on the distance thereof to Cl$^-$. While not wanting to be bound by theory, it is understood that because the Li$^+$ site is substituted with a cation (M$^+$) of a metal (M) having a larger ionic radius than that of Li$^+$ ions, for example, Na, K, Cs, Cu, or Ag, a space in which Li$^+$ cations freely migrate may be formed. In addition, as compared with a halogen-based solid ion conductor with a metal having an oxidation state of +3 as a central metal, for example Li$_3$(M1)X$_6$ (wherein M1 is a metal having an oxidation state of +3), a lithium vacancy occurs between layers. As a result, mobility of lithium ions can be increased, and lithium-ion conductivity may be improved.

When the solid electrolyte including the halogen-based solid ion conductor according to an embodiment is used in an electrochemical device, the electrochemical device may have excellent discharge capacity and lifespan characteristics.

The compound represented by Formula 1 may include one or more compounds represented by Formula 2 or Formula 3:

$$Li_{2+x}M'_xZr_{1-x}X_y \quad \text{Formula 2}$$

wherein in Formula 2,

M' may be one or more lanthanide metals having an oxidation state of +3 and a crystal ionic radius of about 104 pm to about 109 pm, X may be one or more halogen elements, and 0<x<1, and 0<y<7.

$$Li_{p-q}M_qM'_rZr_{1-r}X_w \quad \text{Formula 3}$$

wherein in Formula 3,

M may be one or more metals of Na, K, Cs, Cu, or Ag, and having an oxidation state of +1, M' may be one or more lanthanide metals having an oxidation state of +3 and a crystal ionic radius of about 104 pm to about 109 pm, X may be one or more halogen elements, and 1<p<3, 0≤q<1, 0<r<1, and 0<w<7.

For example, M may have an oxidization state of +1 and be one or more metals of Na, K, Cs, Cu, or Ag, M' may have an oxidation state of +3, and may be one or more of Ho, Dy, Tb, Eu, or Gd, and X may be one or more of Cl or Br. In an aspect, 0.1<x<0.9, 0.2<x<0.8, or 0.3<x<0.7. In an aspect, 0.1<y<7, 0.2<y<6, or 0.3<y<6. In an aspect 1.2<p<2.8, 1.4<p<2.6, or 1.8<p<2.3. In an aspect, 0<q<1, 0.1<q<0.8, or 0.2<q<0.6. In an aspect, 0<r<1, 0.1<r<0.8, or 0.2<r<0.6. In an aspect, 0.1<w<7, 0.2<w<6, or 0.3<w<6.

For example, the compound may include one or more of Li$_{2.7}$Ho$_{0.7}$Zr$_{0.3}$Cl$_6$, Li$_{2.5}$Ho$_{0.5}$Zr$_{0.5}$Cl$_6$, Li$_{2.3}$Ho$_{0.3}$Zr$_{0.7}$Cl$_6$, Li$_{2.25}$Ho$_{0.25}$Zr$_{0.75}$Cl$_6$, Li$_{2.2}$Ho$_{0.2}$Zr$_{0.8}$Cl$_6$, Li$_{2.15}$Ho$_{0.15}$Zr$_{0.85}$Cl$_6$, Li$_{2.25}$Ho$_{0.05}$Zr$_{0.9}$Cl$_6$, Li$_{2.1}$Ho$_{0.1}$Zr$_{0.9}$Cl$_6$, Li$_{2.05}$Ho$_{0.05}$Zr$_{0.95}$Cl$_6$, Li$_2$Na$_{0.1}$Ho$_{0.1}$Zr$_{0.9}$Cl$_6$;

Li$_{2.7}$Dy$_{0.7}$Zr$_{0.3}$Cl$_6$, Li$_{2.5}$Dy$_{0.5}$Zr$_{0.5}$Cl$_6$, Li$_{2.3}$Dy$_{0.3}$Zr$_{0.7}$Cl$_6$, Li$_{2.25}$Dy$_{0.25}$Zr$_{0.75}$Cl$_6$, Li$_{2.2}$Dy$_{0.2}$Zr$_{0.8}$Cl$_6$, Li$_{2.15}$Dy$_{0.15}$Zr$_{0.85}$Cl$_6$, Li$_{2.25}$Dy$_{0.05}$Zr$_{0.9}$Cl$_6$, Li$_{0.1}$Dy$_{0.1}$Zr$_{0.9}$Cl$_6$, Li$_{2.05}$Dy$_{0.05}$Zr$_{0.95}$Cl$_6$;

Li$_{2.7}$Tb$_{0.7}$Zr$_{0.3}$Cl$_6$, Li$_{2.5}$Tb$_{0.5}$Zr$_{0.5}$Cl$_6$, Li$_{2.3}$Tb$_{0.3}$Zr$_{0.7}$Cl$_6$, Li$_{2.25}$Tb$_{0.25}$Zr$_{0.75}$Cl$_6$, Li$_{2.2}$Tb$_{0.2}$Zr$_{0.8}$Cl$_6$, Li$_{2.15}$Tb$_{0.15}$Zr$_{0.85}$Cl$_6$, Li$_{2.25}$Tb$_{0.05}$Zr$_{0.9}$Cl$_6$, Li$_{2.1}$Tb$_{0.1}$Zr$_{0.9}$Cl$_6$, Li$_{2.05}$Tb$_{0.05}$Zr$_{0.95}$Cl$_6$;

Li$_{2.7}$Eu$_{0.7}$Zr$_{0.3}$Cl$_6$, Li$_{2.5}$Eu$_{0.5}$Zr$_{0.5}$Cl$_6$, Li$_{2.3}$Eu$_{0.3}$Zr$_{0.7}$Cl$_6$, Li$_{2.25}$Eu$_{0.25}$Zr$_{0.75}$Cl$_6$, Li$_{2.2}$Eu$_{0.2}$Zr$_{0.8}$Cl$_6$, Li$_{2.15}$Eu$_{0.15}$Zr$_{0.85}$Cl$_6$, Li$_{2.25}$Eu$_{0.05}$Zr$_{0.9}$Cl$_6$, Li$_{2.1}$Eu$_{0.1}$Zr$_{0.9}$Cl$_6$, Li$_{2.05}$Eu$_{0.05}$Zr$_{0.95}$Cl$_6$; or

Li$_{2.7}$Gd$_{0.7}$Zr$_{0.3}$Cl$_6$, Li$_{2.5}$Gd$_{0.5}$Zr$_{0.5}$Cl$_6$, Li$_{2.3}$Gd$_{0.3}$Zr$_{0.7}$Cl$_6$, Li$_{2.25}$Gd$_{0.25}$Zr$_{0.75}$Cl$_6$, Li$_{2.2}$Gd$_{0.2}$Zr$_{0.8}$Cl$_6$, Li$_{2.15}$Gd$_{0.15}$Zr$_{0.85}$Cl$_6$, Li$_{2.25}$Gd$_{0.05}$Zr$_{0.9}$Cl$_6$, or Li$_{2.1}$Gd$_{0.1}$Zr$_{0.9}$Cl$_6$, Li$_{2.05}$Gd$_{0.05}$Zr$_{0.95}$Cl$_6$.

The compound may have a distorted rock-salt type structure as described above.

The compound may have a crystal structure belonging to a P3m1 space group or a P3m1-like space group.

The P3m1 space group has two-fold, three-fold, and six-fold rotation axes perpendicular to a plane. The P3m1 space group has three symmetry planes consisting of a symmetry plane perpendicular to x-axis, a symmetry plane perpendicular to y-axis, and a symmetry plane that is slanted equally with respect to x-axis and y-axis. When two or more layers are stacked in a closed-packing structure, the P3m1 space group maintains three symmetry planes in total and has at least a three-fold rotation axis parallel to [001] at (000), (⅓ ⅔ 0), and (⅔ ⅓ 0). The P3m1-like space group refers to a crystal structure similar to that of the P3m1 space group and having a similar peak pattern to that of the P3m1 space group crystal structure in XRD spectra.

For example, the P3m1 space group crystal structure may exhibit a primary peak at a diffraction angle of 31° 2θ to 33° 2θ in the XRD spectrum obtained with CuKα radiation, and exhibit secondary peaks at a diffraction angle of 15° 2θ to 17° 2θ and 40° 2θ to 42° 2θ.

Regarding the compound, the peak shown at a diffraction angle of 31° 2θ to 33° 2θ in the XRD spectrum obtained using CuKα radiation may be shifted to a smaller angle than a corresponding peak of the Li$_2$ZrCl$_6$ compound. The compound may have a crystal structure with lithium ion transport channels expanded in the x-axis, y-axis, and z-axis directions.

The solid ion conductor may have an ionic conductivity of about 2.1×10$^{-4}$ millisiemens per centimeter (mS·cm$^{-1}$) or more at 25° C. For example, the solid ion conductor may have an ionic conductivity at 25° C. of about 2.2×10$^{-4}$ mS·cm$^{-1}$ or more, about 2.3×10$^{-4}$ mS·cm$^{-1}$ or more, about 2.5×10$^{-4}$ mS·cm$^{-1}$ or more, or about 3.0×10$^{-4}$ mS·cm$^{-1}$ or more. The solid ion conductor may have an ion conductivity of about 2.1×10$^{-4}$ mS/cm to about 1×10$^{-2}$ S/cm, about 2.5×10$^{-4}$ mS/cm to about 0.5×10$^{-2}$ S/cm, or about 3.0×10$^{-4}$ mS/cm to about to about 1×10$^{-3}$ S/cm. The ionic conductivity of the solid ion conductor can be measured by electrochemical impedance spectroscopy (EIS). See, for example, J.-M. Winand et al., "Measurement of Ionic Conductivity in Solid Electrolytes," Europhysics Letters, vol. 8, no. 5, p. 447-452, 1989, the content of which is included herein by reference.

The solid ion conductor may have an activation energy of 0.27 electron volt (eV) to 0.38 eV, about 0.28 eV to about 0.35 eV, or about 0.29 eV to about 0.34 eV at 25° C. The activation energy can be measured as illustrated in the examples. The lower the activation energy, the easier Li ions can conduct.

Solid Electrolyte and Electrochemical Device

A solid electrolyte according to another embodiment may include the solid ion conductor. The solid electrolyte may further comprise at least one of an oxide solid electrolyte, or a sulfide solid electrolyte. Also, the solid electrolyte may be in the form of a layer to provide a solid electrolyte layer. The solid electrolyte layer may have a thickness that is less than 0.1 times a width or length of the layer, e.g., a thickness that is 1×10$^{-6}$ to 0.1 times a width or length of the layer. The solid electrolyte may be electrochemically stable in a voltage window of about 0.6 volt (V) to about 4.3 V or about 0.8 V to about 4.1 V versus Li/Li$^+$.

An electrochemical device according to another embodiment may include a positive electrode layer, a negative electrode layer, and a solid electrolyte layer disposed between the positive electrode layer and the negative electrode layer, and also may include the solid electrolyte comprising the solid ion conductor.

The solid ion conductor may be included in one or more of the solid electrolyte layer, the positive electrode layer, the negative electrode layer, a protective film on the positive electrode layer, or a protective film on the negative electrode layer.

The positive electrode layer may include one or more of a positive active material of a lithium transition metal oxide, a lithium transition metal phosphate, or a sulfide, and the solid ion conductor.

For example, the positive active material may be formed using one or more of lithium cobalt oxide (LCO), lithium nickel oxide, lithium nickel cobalt oxide, lithium nickel cobalt aluminum oxide (NCA), lithium nickel cobalt manganese oxide (NCM), lithium manganate, lithium iron phosphate, nickel sulfide, copper sulfide, lithium sulfide, iron oxide, vanadium oxide, or the like. These positive active materials may be used alone or in a combination of at least two thereof. For example, the positive active material may be a lithium salt of a ternary transition metal oxide such as LiNi$_x$Co$_y$Al$_z$O$_2$ (NCA) or LiNi$_x$Co$_y$Mn$_z$O$_2$ (NCM) (where 0<x<1, 0<y<1, 0<z<1, and x+y+z=1).

The positive active material may include a coating layer on the surface thereof. The coating layer may be formed of any suitable material used to form a coating layer of a positive active material of all-solid secondary batteries. For example, the coating layer may comprise Li$_2$O—ZrO$_2$, or the like.

In addition, when the positive active material includes a lithium salt of a ternary transition metal oxide such as NCA or NCM, and nickel (Ni), metal elution of the positive active material may be reduced during charging because the capacity density of the electrochemical device is increased. The electrochemical device may have improved long-term reliability and cycle characteristics during charging.

The positive active material may have a particulate shape such as an elliptical shape or a spherical shape. In addition, a particle diameter of the positive active material is not particularly limited and may be in a range applicable to positive active materials of all-solid state secondary batteries. The amount of the positive active material of the positive electrode layer is not particularly limited and may be in a range applicable to positive electrodes of all-solid state secondary batteries.

The solid electrolyte may have excellent ionic conductivity. When the solid electrolyte is used in an electrochemical device, the electrochemical device may have excellent discharge capacity and lifespan characteristics.

The solid electrolyte layer may include a solid electrolyte, which may include one or more of the solid ion conductor, a sulfide-based solid ion conductor, or an oxide-based solid ion conductor.

The sulfide-based solid ion conductor may include a solid electrolyte represented by Formula 4.

Li$^+$$_{12-n-z}$A$^{n+}$X$^{2-}$$_{6-z}$Y'$^-$$_z$.  Formula 4

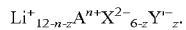

In Formula 4,

A may be P, As, Ge, Ga, Sb, Si, Sn, Al, In, Tl, V, Nb, or Ta,

X may be one or more of S, Se, or Te,

Y' may be one or more of Cl, Br, I, F, CN, OCN, SCN, or N$_3$, and

1<n<5 and 0<z<2.

The sulfide-based solid ion conductor may be an Argyrodite-type compound including one or more of Li$_{7-x}$PS$_{6-x}$Cl$_x$ (where 0≤x≤2), Li$_{7-x}$PS$_{6-x}$Br$_x$ (where 0≤x≤2), or Li$_{7-x}$PS$_{6-x}$I$_x$ (where 0≤x≤2). For example, the sulfide-based solid ion conductor may be an Argyrodite-type compound including one or more of Li$_6$PS$_5$Cl, Li$_6$PS$_5$Br, or Li$_6$PS$_5$I. "Argyrodite" or "argyrodite-type" as used herein means that the compound has a crystal structure isostructural with argyrodite, Ag$_8$GeS$_6$.

The sulfide-based solid ion conductor may include, as desired, one or more of Li$_2$S—P$_2$S$_5$, Li$_2$S—P$_2$S$_5$—LiX (X is a halogen element), Li$_2$S—P$_2$S$_5$—Li$_2$O, Li$_2$S—P$_2$S$_5$—Li$_2$O—LiI, Li$_2$S—SiS$_2$, Li$_2$S—SiS$_2$—LiI, Li$_2$S—SiS$_2$—LiBr, Li$_2$S—SiS$_2$—LiCl, Li$_2$S—SiS$_2$—B$_2$S$_3$—LiI, Li$_2$S—SiS$_2$—P$_2$S$_5$—LiI, Li$_2$S—B$_2$S$_3$, Li$_2$S—P$_2$S$_5$—Z$_m$S$_n$ (where m and n are positive numbers, and Z is one or more of Ge, Zn or Ga), Li$_2$S—GeS$_2$, Li$_2$S—SiS$_2$—Li$_3$PO$_4$, Li$_2$S—SiS$_2$—Li$_p$MO$_q$ (where p and q are positive numbers, and M is one of P, Si, Ge, B, Al, Ga, and In), or the like. For example, the sulfide-based solid ion conductor may include Li$_2$S—P$_2$S$_5$. When the sulfide-based solid ion conductor is Li$_2$S—P$_2$S$_5$, a mixed molar ratio of Li$_2$S to P$_2$S$_5$ may be, for example, in the range of 50:50 to 90:10.

The oxide-based solid ion conductor may be a Garnet-based ceramic such as Li$_{3+x}$La$_3$M$_2$O$_{12}$ (where M is one or more of Te, Nb, or Zr, and x is an integer from 1 to 10), lithium phosphorous oxynitrides (Li$_x$PO$_y$N$_z$) (where 0<x<1, 0<y<1, and 0<z<1), Li$_x$P$_y$O$_z$N$_k$ (where 2.7≤x≤3.3, 0.8≤y≤1.2, 3.5≤z≤3.9, and 0.1≤k≤0.5), Li$_w$PO$_x$N$_y$S$_z$ (where 0<w<1, 0<x<1, 0<y<1, and 0<z<1), Li$_{1+x+y}$Al$_x$Ti$_{2-x}$Si$_y$P$_{3-y}$O$_{12}$ (0<x<2 and 0≤y<3), BaTiO$_3$, Pb(Zr$_x$Ti$_{1-x}$)O$_3$ (PZT) (0≤x≤1), Pb$_{1-x}$La$_x$Zr$_{1-y}$Ti$_y$O$_3$ (PLZT) (where 0≤x<1 and 0≤y<1), Pb(Mg$_{1/3}$Nb$_{2/3}$)O$_3$—PbTiO$_3$ (PMN-PT), HfO$_2$, SrTiO$_3$, SnO$_2$, CeO$_2$, Na$_2$O, MgO, NiO, CaO, BaO, ZnO, ZrO$_2$, Y$_2$O$_3$, Al$_2$O$_3$, TiO$_2$, SiO$_2$, SiC, lithium phosphate (Li$_3$PO$_4$), lithium titanium phosphate (Li$_x$Ti$_y$(PO$_4$)$_3$, where 0<x<2 and 0<y<3), lithium aluminum titanium phosphate (Li$_x$Al$_y$Ti$_z$(PO$_4$)$_3$, where 0<x<2, 0<y<1, and 0<z<3), Li$_{1+x+y}$(Al$_a$Ga$_{1-z}$)$_x$(Ti$_b$Ge$_{1-b}$)$_{2-x}$Si$_y$P$_{3-y}$O$_{12}$ (where 0≤x≤1, 0≤y≤0≤a≤1, and 0≤b≤1), lithium lanthanum titanate (Li$_x$La$_y$TiO$_3$, where 0<x<2 and 0<y<3), lithium germanium thiophosphate (Li$_x$Ge$_y$P$_z$S$_w$, where 0<x<4, 0<y<1, 0<z<1, and 0<w<5), lithium nitride glasses (Li$_x$N$_y$, where 0<x<4 and 0<y<2), SiS$_2$ (Li$_x$Si$_y$S$_z$, where 0<x<3, 0<y<2, and 0<z<4), P$_2$S$_5$ glasses (Li$_x$P$_y$S$_z$, where 0<x<3, 0<y<3, and 0<z<7), Li$_2$O, LiF, LiOH, Li$_2$CO$_3$, LiAlO$_2$, or Li$_2$O—Al$_2$O$_3$—SiO$_2$—P$_2$O$_5$—TiO$_2$—GeO$_2$ ceramics. For example, as the oxide-based solid ion conductor, a Garnet-based oxide-based solid electrolyte having excellent reduction stability in contact with a lithium negative electrode may be used. As the Garnet-based ceramics Li$_{3+x}$La$_3$M$_2$O$_{12}$ (where M=one or more of Te, Nb, or Zr), for example, Li$_{6.5}$La$_3$Zr$_{1.5}$Ta$_{0.5}$O$_{12}$ (LLZO) may be used. As used herein, the term "Garnet" or "Garnet-based" means that the compound is isostructural with garnet, e.g., Mg$_3$Al$_2$(SiO$_4$)$_3$.

The solid electrolyte may further include a binder. For example, as the binder included in the solid electrolyte, one or more of styrene butadiene rubber (SBR), polytetrafluoroethylene, polyvinylidene fluoride, or polyethylene may be used. However, the embodiment is not limited thereto and any suitable binder may also be used.

The solid electrolyte may further include an organic solid electrolyte, if desired. As the organic solid electrolyte, for example, one or more of polyethylene derivatives, polyethylene oxide derivatives, polypropylene oxide derivatives, phosphoric acid ester polymers, poly agitation lysine, polyester sulfide, polyvinyl alcohol, polyvinylidene fluoride, or polymers including ionic dissociation groups may be used. The solid electrolyte may further include an amorphous solid electrolyte, if desired. The solid electrolyte may further include a mixed solid electrolyte in which a crystalline solid electrolyte and an amorphous solid electrolyte are mixed. The solid electrolyte may further include a lithium salt and/or an ionic liquid, if desired.

The solid electrolyte may further include an ion-conductive inorganic material, if desired.

The ion-conductive inorganic material may include one or more of a glass or amorphous metal ion conductor, a ceramic activated metal ion conductor, and a glass ceramic activated metal ion conductor, but embodiments are not limited thereto, and any materials used in the art as ion-conductive inorganic material may also be used. The ion-conductive inorganic material may be in the form of, for example, ion-conductive inorganic particles or sheets thereof.

The ion-conductive inorganic material may be, for example, one or more of $BaTiO_3$, $Pb(Zr_xTi_{1-x})O_3(PZT)$ ($0 \leq x \leq 1$), $Pb_{1-x}La_xZr_{1-y}Ti_yO_3$ (PLZT) (where $0 \leq x < 1$ and $0 \leq y < 1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, where $0 < x < 2$ and $0 < y < 3$), lithium aluminum titanium phosphate ($Li_xAl_yTi_z(PO_4)_3$, where $0 < x < 2$, $0 < y < 1$, and $0 < z < 3$), $Li_{1+x+y}(Al_aGa_{1-a})_x(Ti_bGe_{1-b})_{2-x}Si_yP_{3-y}O_{12}$ (where $0 \leq x \leq 1$, $0 \leq y \leq 1$, $0 \leq a \leq 1$, and $0 \leq b \leq 1$), lithium lanthanum titanate ($Li_xLa_yTiO_3$, where $0 < x < 2$ and $0 < y < 3$), lithium germanium thiophosphate ($Li_xGe_yP_zS_w$, where $0 < x < 4$, $0 < y < 1$, $0 < z < 1$, and $0 < w < 5$), lithium nitride ($Li_xN_y$, where $0 < x < 4$ and $0 < y < 2$), a $SiS_2$ glass ($Li_xSi_yS_z$, where $0 < x < 3$, $0 < y < 2$, and $0 < z < 4$), a $P_2S_5$ glass ($Li_xP_yS_z$, where $0 < x < 3$, $0 < y < 3$, and $0 < z < 7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$ ceramic, or a Garnet-based ceramic ($Li_{3+x}La_3M_2O_{12}$, where M is one or more of Te, Nb, or Zr).

The solid electrolyte may be in the form of a powder or a molded product. The solid electrolyte in the form of a molded product may be in the form of pellets, a sheet, a thin film, or the like, but is not limited thereto and may also have various shapes according to the intended use.

The solid electrolyte layer may have a thickness of about 10 micrometers (μm) to 1 millimeter (mm), about 15 μm to about 900 μm, about 20 μm to about 800 μm, or about 30 μm to about 500 μm. The solid electrolyte layer may have a single-layered structure or a multi-layered structure including two or more layers.

For example, the solid electrolyte layer may include the solid ion conductor including a compound represented by Formula 1 alone in the solid electrolyte layer. Alternatively, the solid electrolyte layer may further include an oxide-based solid ion conductor or a sulfide-based solid ion conductor, as a separate layer, in addition to the solid ion conductor.

For example, the solid electrolyte may include a solid ion conductor including a compound, represented by Formula 1, alone in the positive electrode layer and/or the negative electrode layer. Alternatively, in addition to the solid ion conductor, a sulfide-based solid ion conductor, an oxide-based solid ion conductor, and/or an ionic liquid-containing electrolyte may be included in the positive electrode layer and/or the negative electrode layer as a separate single-layered or multi-layered structure. For example, the electrochemical device may sequentially include a positive electrode layer, an ionic liquid-containing electrolyte, an oxide-based solid ion conductor (or a sulfide-based solid ion conductor), the solid ion conductor including the compound represented by Formula 1, an oxide-based solid ion conductor (or a sulfide-based solid ion conductor), and a negative electrode layer in the stated order.

The electrochemical device may be an all-solid state secondary battery or a metal air battery. However, the embodiment is not limited thereto and any electrochemical devices available in the art may also be used.

For example, the electrochemical device may be an all-solid state secondary battery.

Figure 2:
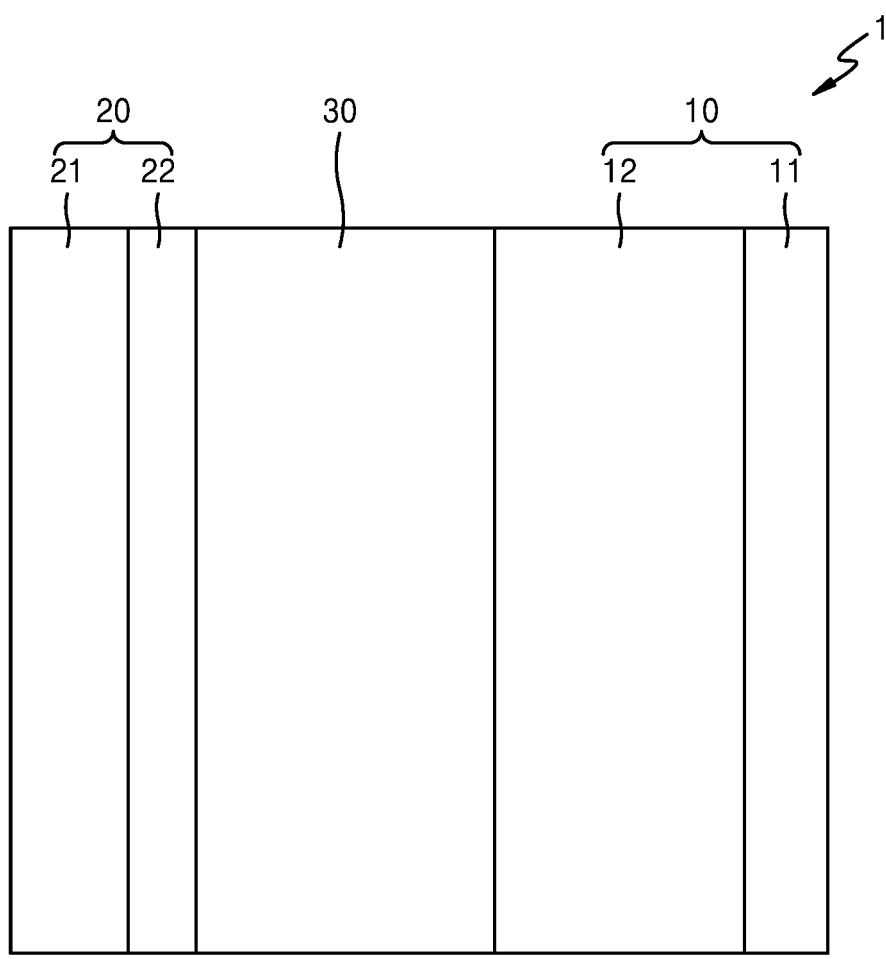
FIGS. 2 to 4 are cross-sectional views of embodiments of all-solid-state secondary batteries.
Figure 3:
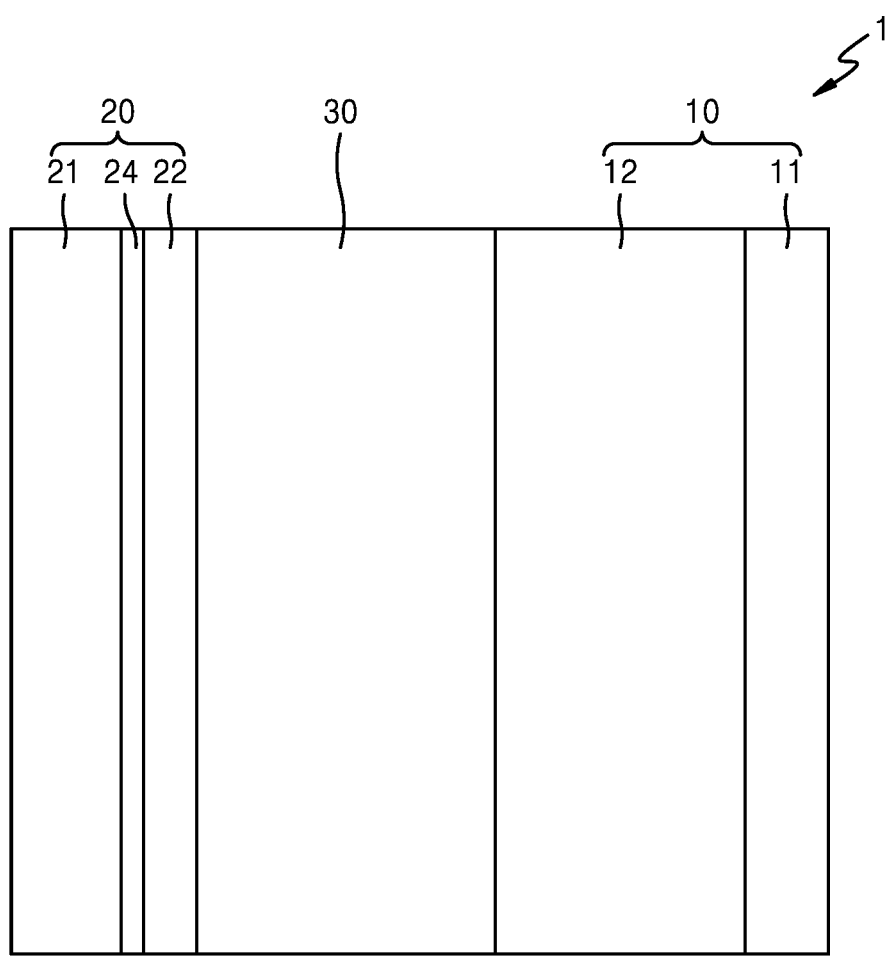
Figure 4:
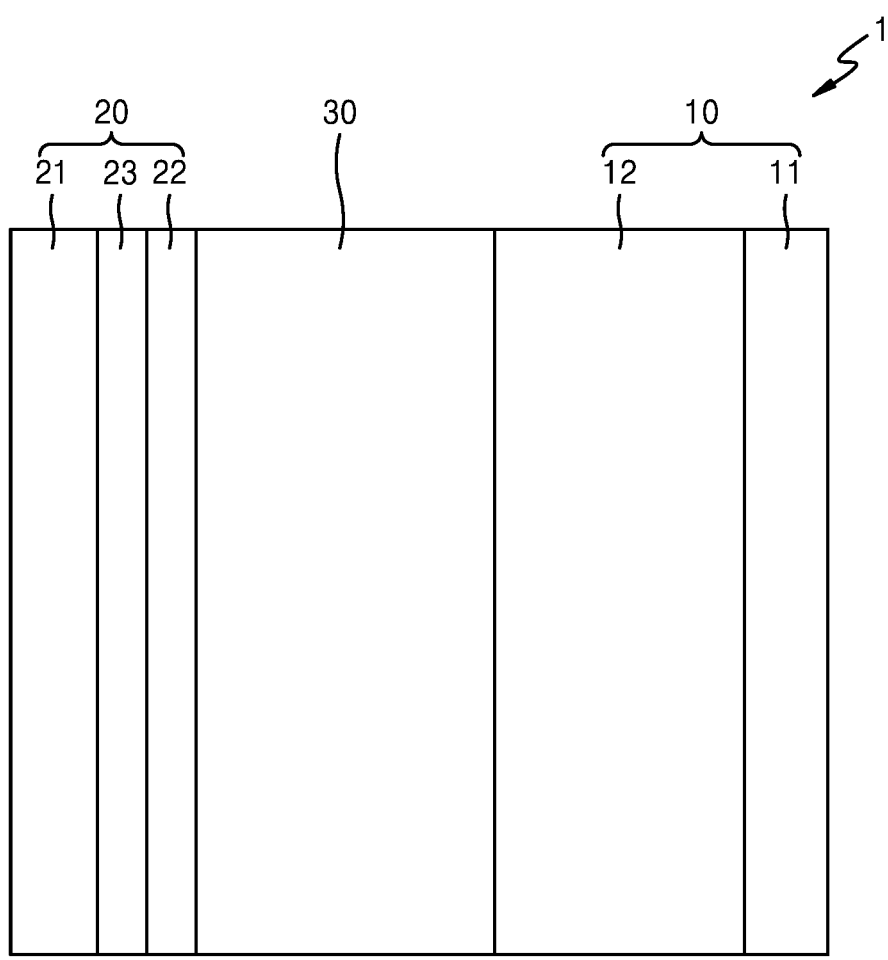

FIGS. 2 to 4 are cross-sectional views of embodiments of all-solid-state secondary batteries.

Referring to FIGS. 2 to 4, an all-solid-state secondary battery 1 includes a positive electrode layer 10 including a positive current collector 11 and a positive active material layer 12; a negative electrode layer 20; and a solid electrolyte layer 30 between the positive electrode layer 10 and the negative electrode layer 20, wherein the negative electrode layer 20 includes a negative current collector 21 and a negative active material layer 22 on the negative current collector 21, and the negative active material layer 22 includes lithium metal or a negative active material forming an alloy with lithium. One or more of the positive electrode layer 10, the negative electrode layer 20, or the solid electrolyte layer 30 of the all-solid-state secondary battery 1 may include the solid ion conductor including the compound represented by Formula 1.

The positive current collector 11 may be formed using, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof in the form of a plate or foil. The positive current collector 11 may be omitted.

The positive active material layer 12 may include the above-described positive active material and/or solid electrolyte. The solid electrolyte included in the positive electrode layer 10 may be the same as or different from the solid electrolyte included in the solid electrolyte layer 30.

The positive electrode layer 10 may further include an ion-conductive inorganic material. Types of the ion-conductive inorganic material are as those described above and thus, descriptions thereof will be omitted.

The positive electrode layer 10 may further include, for example, one or more of a conductive agent, a binder, a filler, a dispersant, or an ion-conductive adjuvant, which are appropriately mixed, in addition to the positive active material and/or the solid electrolyte as described above.

The conductive agent that may be mixed with the positive electrode layer 10 may be one or more of graphite, carbon black, acetylene black, Ketjen black, carbon fiber, or metal powder. The binder that may be mixed with the positive electrode layer 10 may be one or more of styrene butadiene rubber (SBR), polytetrafluoroethylene, polyvinylidene fluoride, or polyethylene. A coating agent, a dispersant, and an ion-conductive adjuvant that can be mixed with the positive electrode layer 10 may be any known materials used in electrodes of all-solid state secondary batteries.

The negative electrode layer 20 may include the negative current collector 21 and the negative active material layer 22.

A material constituting the negative current collector 21 may be one or more of copper (Cu), stainless steel, titanium (Ti), iron (Fe), cobalt (Co), or nickel (Ni). The negative current collector 21 may be formed of a metal or an alloy or a coated material of at least two metals. The negative current collector 21 may be formed, for example, in a plate or foil shape.

The negative active material layer 22 may include a metallic negative active material, a carbonaceous negative active material, or any combination thereof.

For example, the negative active material may include lithium or an alloy including lithium and one or more of indium (In), silicon (Si), gallium (Ga), tin (Sn), aluminum (Al), titanium (Ti), zirconium (Zr), niobium (Nb), germanium (Ge), antimony (Sb), bismuth (Bi), gold (Au), platinum (Pt), palladium (Pd), magnesium (Mg), silver (Ag), or zinc (Zn). However, the embodiment is not limited thereto and any metal or metalloid alloyable with lithium and well known in the art may also be used.

As the carbonaceous negative active material, one or more of graphite, carbon black (CB), acetylene black (AB), furnace black (FB), Ketjen black (KB), graphene, carbon nanotube, or carbon nanofiber may be used.

The negative active material layer 22 may include additives, such as one or more of a conductive agent, a binder, a filler, a dispersant, or an ion-conductive adjuvant, which may be appropriately mixed.

The negative active material layer 22 may be a negative electrode-free coating layer, if desired. For example, the negative electrode-free coating layer may include a metal such as silicon, and carbon, and have a structure in which a conductive binder is arranged around the metal and carbon. The negative electrode-free coating layer may have a thickness of about 1 μm to about 20 μm, about 2 μm to about 15 μm, or about 4 μm to about 12 μm.

The solid electrolyte layer 30 may be formed by deposition using a known method for layer formation such as aerosol deposition, cold spray, sputtering, and the like. Alternatively, the solid electrolyte layer 30 may be formed by pressurizing single particles of the solid electrolyte. Alternatively, the solid electrolyte layer 30 may be formed by mixing the solid electrolyte, a solvent, and a binder, and coating, drying, and pressurizing the mixture.

As shown in FIG. 3, a thin film 24 may be formed on the surface of the negative current collector 21. The thin film 24 may include an element alloyable with lithium. As the element alloyable with lithium, for example, one or more of gold, silver, zinc, tin, indium, silicon, aluminum, or bismuth may be used. The thin film 24 may be formed of one type of these metals or an alloy of various types thereof. Due to the presence of the thin film 24, a deposition pattern of a metal layer 23 as shown in FIG. 4 may be further flattened, and characteristics of the all-solid state secondary battery 1 may further be improved.

The thin film 24 may have a thickness of 1 nm to 500 nm, about 50 nm to about 450 nm, about 100 nm to about 400 nm, or about 150 nm to about 350 nm, but embodiments are not limited thereto. When the thickness of the thin film 24 is within the above range, the thin film 24 may sufficiently exhibit its function, and an appropriate amount of lithium is precipitated in the negative electrode layer, and thus the all-solid state secondary battery 1 may have excellent characteristics. The thin film 24 may be formed on the negative current collector 21 by vacuum deposition, sputtering, plating, or the like.

Method of Preparing Solid Ion Conductor

A method of preparing a solid ion conductor according to an embodiment may include: mechanically milling a solid ion conductor-forming precursor to form a solid ion conductor-forming precursor mixture; and molding the solid ion conductor-forming precursor mixture to prepare a solid ion conductor comprising a compound represented by Formula 1:

$$Li_aM_bM'_cZr_dX_e \qquad \text{Formula 1}$$

wherein in Formula 1,

M may be one or more metals of Na, K, Cs, Cu, or Ag, and having an oxidation state of +1, M' may be one or more of lanthanide metals having an oxidation state of +3 and a crystal ionic radius of about 104 pm to about 109 pm, X may be one or more halogen elements, and $1<a<3.5$, $0\leq b<1$, $0<c<1.5$, $0<d<1.5$, and $0<e<7$.

According to the method of preparing a solid ion conductor, it may be facilitated to prepare a solid ion conductor at a low temperature, the solid ion conductor having excellent ionic conductivity and providing electrochemical stability in a wide voltage window and improved charging and discharging characteristics such as discharge capacity and lifespan characteristics when used in an electrochemical device as a solid electrolyte.

When the solid ion conductor-forming precursor mixture is prepared, a Li precursor, an M precursor or/and M' precursor, and a halogen element precursor may be mixed. The M precursor may be a precursor of a metal element having an oxidation state of +1, and the M' precursor may be a precursor of a lanthanide metal element having an oxidation state of +3 and a crystal ionic radius of about 104 pm to about 109 pm.

The Li precursor, the M precursor, and the M' precursor may each include one or more of a chloride, a halide, an oxide, a nitride, an oxynitride, a nitrate, a hydroxide, or a carbonate. For example, the Li precursor may be lithium chloride. For example, the M precursor may include one or more of chlorides, oxides, nitrides, oxynitrides, nitrates, hydroxides, or carbonates of sodium (Na), potassium (K), cesium (Cs), copper (Cu), or silver (Ag). For example, the M' precursor may be a chloride of one or more of holmium (Ho), dysprosium (Dy), terbium (Tb), europium (Eu), or gadolinium (Gd).

The compound may be prepared by preparing a mixture by contacting starting materials with each other in appropriate amounts, for example, stoichiometric amounts. The mixture is mechanically milled.

The mechanical milling may be performed by one or more of ball milling, airjet-milling, bead milling, roll milling, planetary milling, hand milling, high-energy ball milling, stirred ball milling, vibrating milling, mechanofusion milling, shaker milling, attritor milling, disk milling, shape milling, nauta milling, nobilta milling, or high-speed mix. For example, the mechanical milling may be planetary milling, and may be performed at room temperature. The method may further include molding the mixture after the mechanical milling.

The method may further include conditioning the mixture after the mechanical milling. Through conditioning, the temperature of the product having undergone the mechanical milling may be cooled. For example, the mixture may be left to stand at room temperature (about 20° C. to about 25° C.) for about 1 to about 10 minutes or about 2 to about 8 minutes to control the temperature of the product having undergone the mechanical milling to 120° C. or lower, for example, about 20° C. to about 60° C.

Hereinafter, the present disclosure will be described in more detail with reference to the following examples and comparative examples. However, the following examples are merely presented to exemplify the present disclosure and the scope of the present disclosure is not limited thereto.

EXAMPLES

Solid Ion Conductor

Example 1

Preparation of $Li_{2.7}Ho_{0.7}Zr_{0.3}Cl_6$ Solid Ion Conductor

LiCl, HoCl$_3$, and ZrCl$_4$ were added into a reactor in a stoichiometric molar ratio of 2.7:0.7:0.3 and mixed to prepare a precursor mixture for forming a solid ion conductor. The solid ion conductor-forming precursor mixture was added to a planetary mill (Pulverisette 7 premium line) containing zirconia (YSZ) balls having a diameter of 10 mm, and a cycle of mixing at 600 rpm for 15 minutes and resting for 5 minutes was repeated for 24 hours in total to prepare a precursor mixture. The precursor mixture was added to a 1-inch diameter pelletizer and a weight of 5 tons was applied thereto using a uniaxial pressure for 2 minutes to prepare $Li_{2.7}Ho_{0.7}Zr_{0.3}Cl_6$ solid ion conductor pellets in the form of circular disks.

Example 2

Preparation of $Li_{2.5}Ho_{0.5}Zr_{0.5}Cl_6$ Solid Ion Conductor $Li_{2.5}Ho_{0.5}Zr_{0.5}Cl_6$ solid ion conductor pellets were prepared in the same manner as in Example 1, except that LiCl, HoCl$_3$, and ZrCl$_4$ were added into a reactor in a stoichiometric molar ratio of 2.5:0.5:0.5.

Example 3

Preparation of $Li_{2.3}Ho_{0.3}Zr_{0.7}Cl_6$ Solid Ion Conductor $Li_{2.3}Ho_{0.3}Zr_{0.7}Cl_6$ solid ion conductor pellets were prepared in the same manner as in Example 1, except that LiCl, HoCl$_3$, and ZrCl$_4$ were added into a reactor in a stoichiometric molar ratio of 2.3:0.3:0.7.

Example 4

Preparation of $Li_{2.25}Ho_{0.25}Zr_{0.75}Cl_6$ Solid Ion Conductor $Li_{2.25}Ho_{0.25}Zr_{0.75}Cl_6$ solid ion conductor pellets were prepared in the same manner as in Example 1, except that LiCl, HoCl$_3$, and ZrCl$_4$ were added into a reactor in a stoichiometric ratio of 2.25:0.25:0.75.

Example 5

Preparation of $Li_{2.2}Ho_{0.2}Zr_{0.8}Cl_6$ Solid Ion Conductor $Li_{2.2}Ho_{0.2}Zr_{0.8}Cl_6$ solid ion conductor pellets were prepared in the same manner as in Example 1, except that LiCl, HoCl$_3$, and ZrCl$_4$ were added into a reactor in a stoichiometric molar ratio of 2.2:0.2:0.8.

Example 6

Preparation of $Li_{2.15}Ho_{0.15}Zr_{0.85}Cl_6$ Solid Ion Conductor $Li_{2.15}Ho_{0.15}Zr_{0.85}Cl_6$ solid ion conductor pellets were prepared in the same manner as in Example 1, except that LiCl, HoCl$_3$, and ZrCl$_4$ were added into a reactor in a stoichiometric molar ratio of 2.15:0.15:0.85.

Example 7

Preparation of $Li_{2.25}Ho_{0.05}Zr_{0.9}Cl_6$ Solid Ion Conductor $Li_{2.25}Ho_{0.05}Zr_{0.9}Cl_6$ solid ion conductor pellets were prepared in the same manner as in Example 1, except that LiCl, HoCl$_3$, and ZrCl$_4$ were added into a reactor in a stoichiometric molar ratio of 2.25:0.05:0.9.

Example 8

Preparation of $Li_{2.1}Ho_{0.1}Zr_{0.9}Cl_6$ Solid Ion Conductor $Li_{2.1}Ho_{0.1}Zr_{0.9}Cl_6$ solid ion conductor pellets were prepared in the same manner as in Example 1, except that LiCl, HoCl$_3$, and ZrCl$_4$ were added into a reactor in a stoichiometric molar ratio of 2.1:0.1:0.9.

Example 9

Preparation of $Li_{2.05}Ho_{0.05}Zr_{0.95}Cl_6$ Solid Ion Conductor $Li_{2.05}Ho_{0.05}Zr_{0.95}Cl_6$ solid ion conductor pellets were prepared in the same manner as in Example 1, except that LiCl, HoCl$_3$, and ZrCl$_4$ were added into a reactor in a stoichiometric molar ratio of 2.05:0.05:0.95.

Example 10

Preparation of $Li_{2.5}Dy_{0.5}Zr_{0.5}Cl_6$ Solid Ion Conductor $Li_{2.5}Dy_{0.5}Zr_{0.5}Cl_6$ solid ion conductor pellets were prepared in the same manner as in Example 1, except that LiCl, DyCl$_3$, and ZrCl$_4$ were added into a reactor in a stoichiometric molar ratio of 2.5:0.5:0.5.

Example 11

Preparation of $Li_{2.5}Tb_{0.5}Zr_{0.5}Cl_6$ Solid Ion Conductor $Li_{2.5}Tb_{0.5}Zr_{0.5}Cl_6$ solid ion conductor pellets were prepared in the same manner as in Example 1, except that LiCl, TbCl$_3$, and ZrCl$_4$ were added into a reactor in a stoichiometric molar ratio of 2.5:0.5:0.5.

Example 12

Preparation of $Li_{2.5}Gd_{0.5}Zr_{0.5}Cl_6$ Solid Ion Conductor $Li_{2.5}Gd_{0.5}Zr_{0.5}Cl_6$ solid ion conductor pellets were prepared in the same manner as in Example 1, except that LiCl, GdCl$_3$, and ZrCl$_4$ were added into a reactor in a stoichiometric molar ratio of 2.5:0.5:0.5.

Example 13

Preparation of Li$_2$Na$_{0.1}$Ho$_{0.1}$Zr$_{0.9}$Cl$_6$ Solid Ion Conductor

Li$_2$Na$_{0.1}$Ho$_{0.1}$Zr$_{0.9}$Cl$_6$ solid ion conductor pellets were prepared in the same manner as in Example 1, except that LiCl, NaCl, HoCl$_3$, and ZrCl$_4$ were added into a reactor in a stoichiometric molar ratio of 2:0.1:0.1:0.9.

Comparative Example 1

Preparation of Li$_2$ZrCl$_6$ Solid Ion Conductor

Li$_2$ZrCl$_6$ solid ion conductor pellets were prepared in the same manner as in Example 1, except that LiCl and ZrCl$_4$ were added into a reactor in a stoichiometric molar ratio of 2:1.

Comparative Example 2

Preparation of Li$_3$HoCl$_6$ Solid Ion Conductor

Li$_3$HoCl$_6$ solid ion conductor pellets were prepared in the same manner as in Example 1, except that LiCl and HoCl$_3$ were added into a reactor in a stoichiometric molar ratio of 3:1.

All-Solid State Secondary Battery

Example 14

Manufacture of All-Solid State Secondary Battery

Preparation of Negative Electrode Layer

A Cu current collector having a thickness of 10 μm was arranged on the bottom surface of a tubular cell case having an inner diameter of 13 mm, and a Li-deposited foil having a thickness of 20 μm was sequentially arranged on one surface of the Cu current collector to prepare a negative electrode layer.

Solid Electrolyte Layer

Argyrodite-type Li$_6$PS$_5$Cl solid ion conductor pellets (Mitusi, S33) were prepared. Preparation of negative electrode layer/solid electrolyte layer laminate 150 mg of the Argyrodite-type Li$_6$PS$_5$Cl solid ion conductor pellets were arranged on the negative electrode layer, and a pressure of 250 MPa was applied thereto at 25° C. by cold isotactic pressing (CIP) to prepare a Cu current collector layer/Li layer/Li$_6$PS$_5$Cl solid electrolyte layer (thickness: about 500 μm) laminate.

Preparation of Positive Electrode Layer

LiNi$_{0.8}$Co$_{0.15}$Mn$_{0.05}$O$_2$ (NCM) as a positive active material, Li$_{2.7}$Ho$_{0.7}$Zr$_{0.3}$Cl$_6$ solid ion conductor pellets prepared in Example 1 as a solid electrolyte, and carbon nanofibers (CNF) as a conductive agent were mixed in a mass ratio of 60:35:5. 15 mg of the mixture was applied to an Al foil current collector having a thickness of 18 μm to prepare a positive electrode layer.

Manufacture of All-Solid State Secondary Battery

The positive electrode layer was arranged on the negative electrode layer/solid electrolyte layer laminate and a weight of 4 tons was applied thereto for 2 minutes to manufacture a torque cell-type all-solid state secondary battery.

Examples 15 to 26

Manufacture of All-Solid State Secondary Battery

All-solid state secondary batteries were manufactured in the same manner as in Example 14, except that the solid ion conductor pellets prepared in Examples 2 to 13 were used in the positive electrode layer, respectively.

Comparative Examples 3 to 4

Manufacture of All-Solid State Secondary Battery

All-solid state secondary batteries were manufactured in the same manner as in Example 14, except that the solid ion conductor pellets prepared in Comparative Examples 1 and 2 were used in the positive electrode layer, respectively.

Analysis Example 1

XRD Analysis

Figure 5:
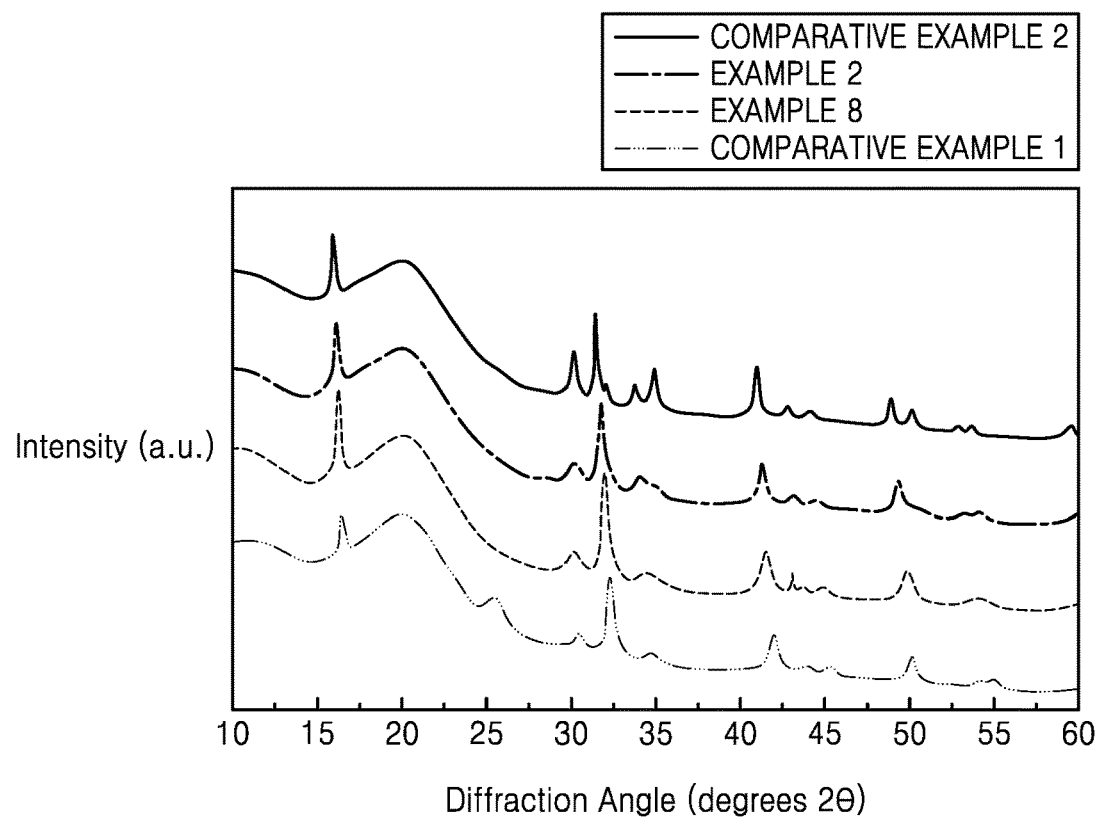
FIG. 5 is a graph of intensity (arbitrary units, a.u.) versus diffraction angle (degrees 2θ) and shows experimental results of X-ray diffraction analysis on the compounds of solid ion conductors prepared in Example 2, Example 8, Comparative Example 1, and Comparative Example 2.
Figure 6:
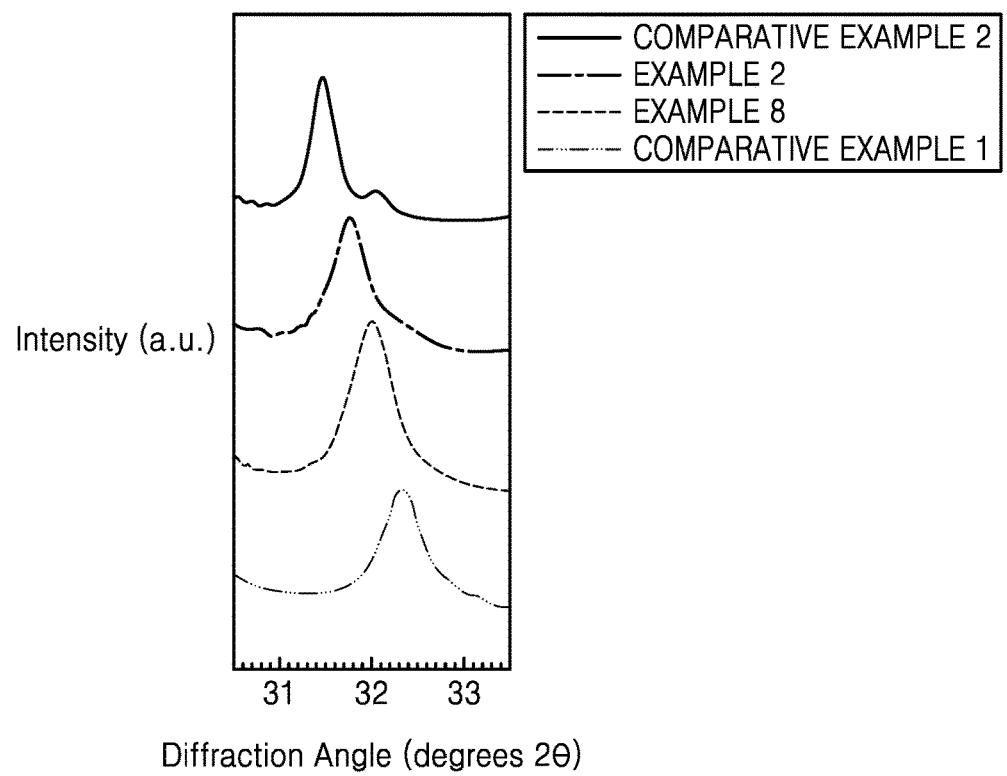
FIG. 6 is a graph of intensity (arbitrary units, a.u.) versus diffraction angle (degrees 2θ) and shows results of magnification of diffraction peaks at a diffraction angle of 31° 2θ to 33° 2θ in the XRD spectra of the compounds of solid ion conductors prepared in Example 2, Example 8, Comparative Example 1, and Comparative Example 2.

X-ray diffraction (XRD) evaluation with CuKα radiation was performed on the solid ion conductors prepared in Example 2, Example 8, Comparative Example 1, and Comparative Example 2. XRD spectra were obtained at a diffraction angle range of 10° 2θ to 60° 2θ at 5°/min. Some of the results are shown in FIG. 5. FIG. 6 shows results of magnification of diffraction peaks at a diffraction angle range of 31° 2θ to 33° 2θ in the XRD spectra.

As shown in FIG. 5, all the solid ion conductor prepared in Example 2, Example 8, Comparative Example 1, and Comparative Example 2 exhibited a primary peak at a diffraction angle range of 31° 2θ to 33° 2θ, and primary peaks at diffraction angle ranges of 15° 2θ to 17° 2θ and 40° 2θ to 42° 2θ. From these results, it was found that all the solid ion conductor prepared in Example 2, Example 8, Comparative Example 1, and Comparative Example 2 have a crystal structure belonging to the P3m1 space group or P3m1-like space group.

As shown in FIG. 6, it was found that primary diffraction peaks at the diffraction angle range of 31° 2θ to 33° 2θ of the solid ion conductor prepared in Example 2 and Example 8 were shifted to a smaller angle than a corresponding peak of the Li$_2$ZrCl$_6$ solid ion conductor prepared in Comparative Example 1. From this, it was found that the solid ion conductors prepared in Examples 2 and 8 have increased crystal lattice sizes as compared with the solid ion conductor prepared in Comparative Example 1.

Evaluation Example 1

Measurement of Ionic Conductivity

The solid ion conductor pellets prepared in Examples 1 to 13, Comparative Example 1, and Comparative Example 2 and having a thickness of about 700 μm were prepared. A platinum (Pt) paste was deposited on both surfaces of the solid ion conductor pellets to a thickness of 10 nm by sputtering to prepare a Pt electrode. Wires were connected to the Pt electrodes on the surfaces of the sample to analyze the sample by electrochemical impedance spectroscopy (EIS). The EIS analysis was performed using an amplitude of about 10 mV and a frequency of 1 Hz to 10$^6$ Hz. Impedance of the pellets was measured at room temperature (25° C.) using a two-probe method with an impedance analyzer (potentiostat/galvanostat and 1455 frequency response analyzer (FRA) multi-channel test module, Solatron Analytical, UK). Resistance was obtained from an arc of a Nyquist plot with respect to measurement results of impedance and areas of the electrode and pellet thickness were corrected based thereon to calculate ionic conductivity. The results (partial) are shown in Table 1 and FIG. 7.

Figure 7:
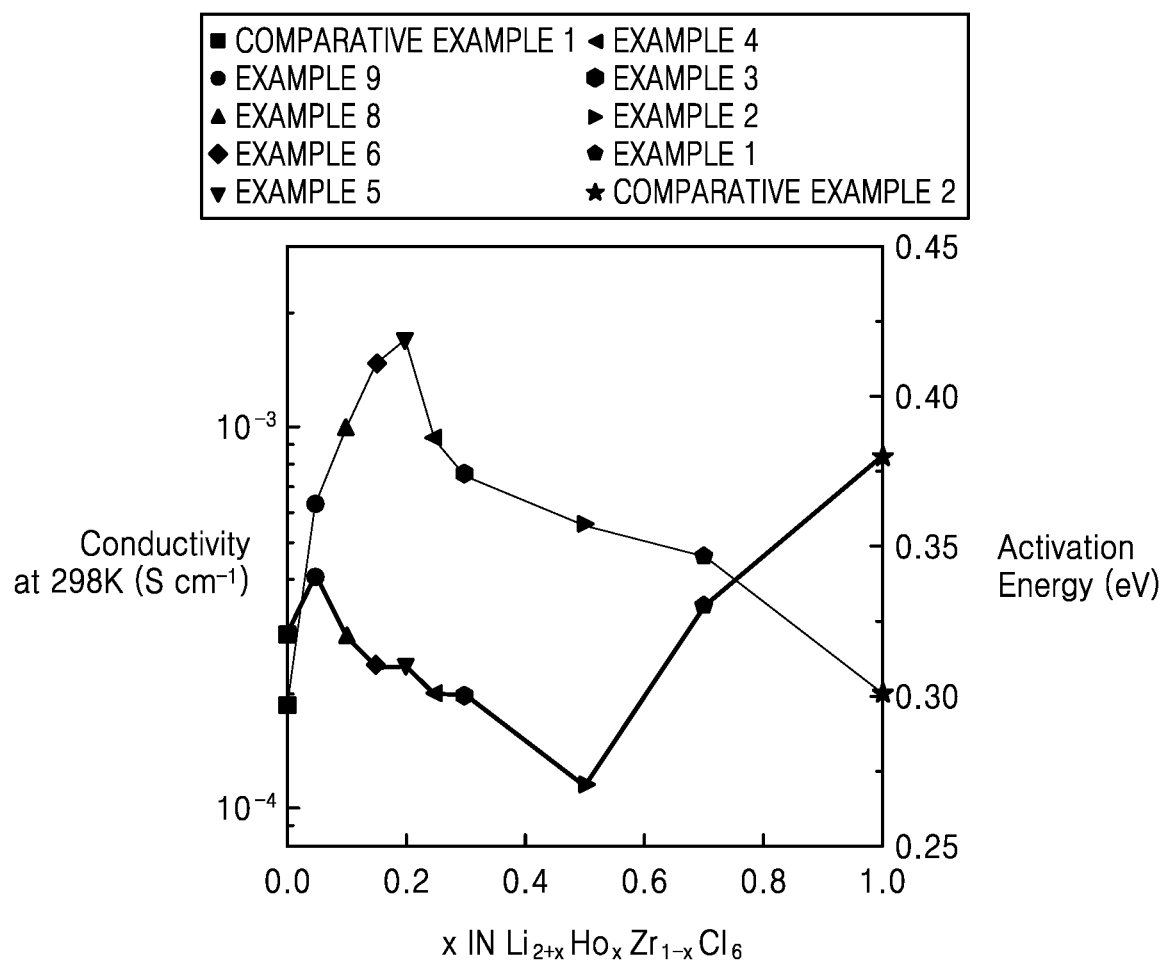
FIG. 7 is a graph of conductivity at 298 K (Siemens per centimeter, S/cm) and activation energy (electron volts, eV) versus x in $Li_{2+x}Ho_xZr_{1-x}Cl_6$ and shows evaluation results of ion conductivities and activation energies of the compounds of solid ion conductors prepared in Example 1 to Example 6, Example 8, Example 9, and Comparative Examples 1 and 2.

In addition, during EIS measurement, the activation energy ($E_a$) with respect to ionic conductivity was calculated from the results of measurements performed while varying the temperature of a chamber in which each sample was loaded. $E_a$ was calculated from a slope value obtained through transformation into the Arrhenius plot (Ln ($\sigma$T) vs. 1/T) of Equation 1 from the ionic conductivity values measured at different temperatures in the region of 298-378K. Some of the results are shown in FIG. 7.

$$\sigma T = A \exp(E_a/RT) \quad \text{Equation 1}$$

In Equation 1, $E_a$ is the activation energy, T indicates the absolute temperature, A indicates the pre-exponential factor, R indicates the gas constant, and a indicates the ionic conductivity.

TABLE 1

| | Ionic conductivity (S/cm, @ 25° C.) |
|---|---|
| Example 1 | $4.6 \times 10^{-4}$ |
| Example 2 | $5.6 \times 10^{-4}$ |
| Example 3 | $3.6 \times 10^{-4}$ |
| Example 4 | $9.4 \times 10^{-4}$ |
| Example 5 | $1.6 \times 10^{-3}$ |
| Example 6 | $1.4 \times 10^{-3}$ |
| Example 7 | $5.3 \times 10^{-4}$ |
| Example 8 | $1.0 \times 10^{-3}$ |
| Example 9 | $6.3 \times 10^{-4}$ |
| Example 10 | $5.2 \times 10^{-4}$ |
| Example 11 | $3.8 \times 10^{-4}$ |
| Example 12 | $5.2 \times 10^{-4}$ |
| Example 13 | $6.1 \times 10^{-4}$ |
| Comparative Example 1 | $1.9 \times 10^{-4}$ |
| Comparative Example 2 | $2.0 \times 10^{-4}$ |

As shown in Table 1, the solid ion conductors prepared in Example 1 to Example 13 exhibited a greater ionic conductivity of $2.1 \times 10^{-4}$ mS·cm$^{-1}$ or more, as compared with those of the solid ion conductors prepared in Comparative Example 1 and Comparative Example 2. Among these solid ion conductors, the solid ion conductor prepared in Example 5 had the greatest ionic conductivity.

As shown in FIG. 7, the solid ion conductors prepared in Example 1 to Example 6, Example 8, and Example 9 exhibited an activation energy of 0.27 eV to 0.38 eV. Among these solid ion conductors, the solid ion conductor prepared in Example 2 had the lowest ionic conductivity.

Evaluation Example 2

Charging/Discharging Test

Evaluation Example 2-1

Initial Discharge Capacity

The initial discharge capacities of the all-solid state secondary batteries prepared in Example 21 and Comparative Example 3 were measured. The cut-off potential was set to 2.0 V to 4.0 V (vs. Li/Li$^+$), and a constant current of 0.1 C was applied. During discharging, currents of 0.03 C, 0.05 C, 0.1 C, 0.5 C, and 1.0 C were applied in a constant current (CC) mode. The results are shown in FIG. 8.

Figure 8:
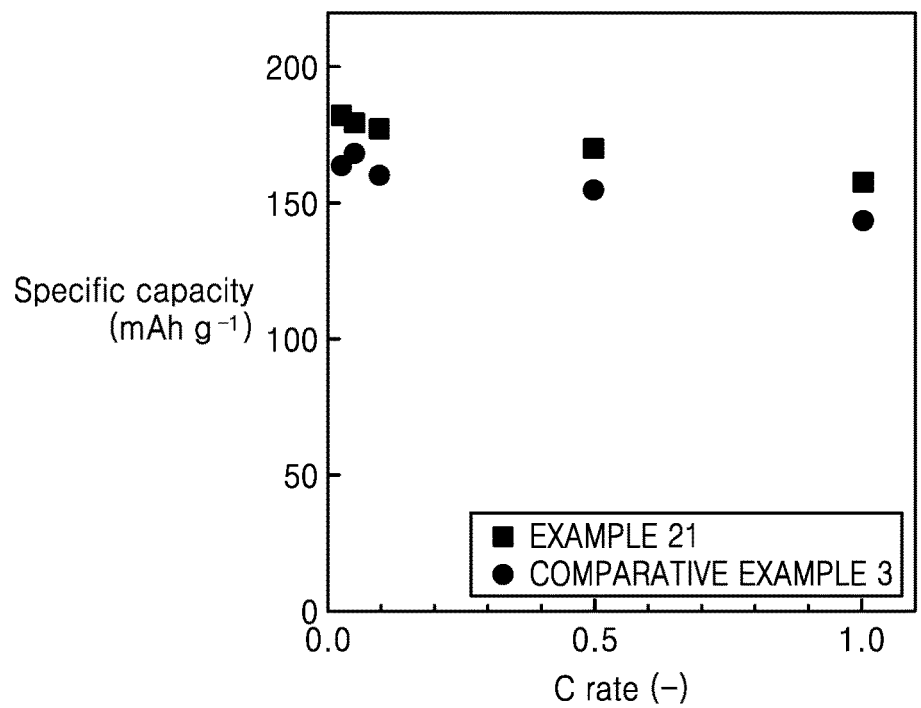
FIG. 8 is a graph of specific capacity (milliampere-hours per gram, mAh/g) versus C rate and shows evaluation results of initial discharge capacities of the all-solid secondary batteries manufactured according to Example 21 and Comparative Example 3 when charged with a constant current of 0.1 C and discharge with a constant current of 0.03 C, 0.05 C, 0.1 C, 0.5 C, or 1.0 C (cut-off voltage: 4.0 V to 2.0 V)

As shown in FIG. 8, the all-solid state secondary battery prepared in Example 21 exhibited a greater initial discharge capacity as compared with the all-solid state secondary battery prepared in Comparative Example 3.

Evaluation Example 2-2

Lifespan Characteristics

Lifespan characteristics of the all-solid state secondary batteries manufactured in Example 21 and Comparative Example 3 were evaluated. The lifespan characteristics were evaluated by a charging/discharging test as described below.

Figure 9:
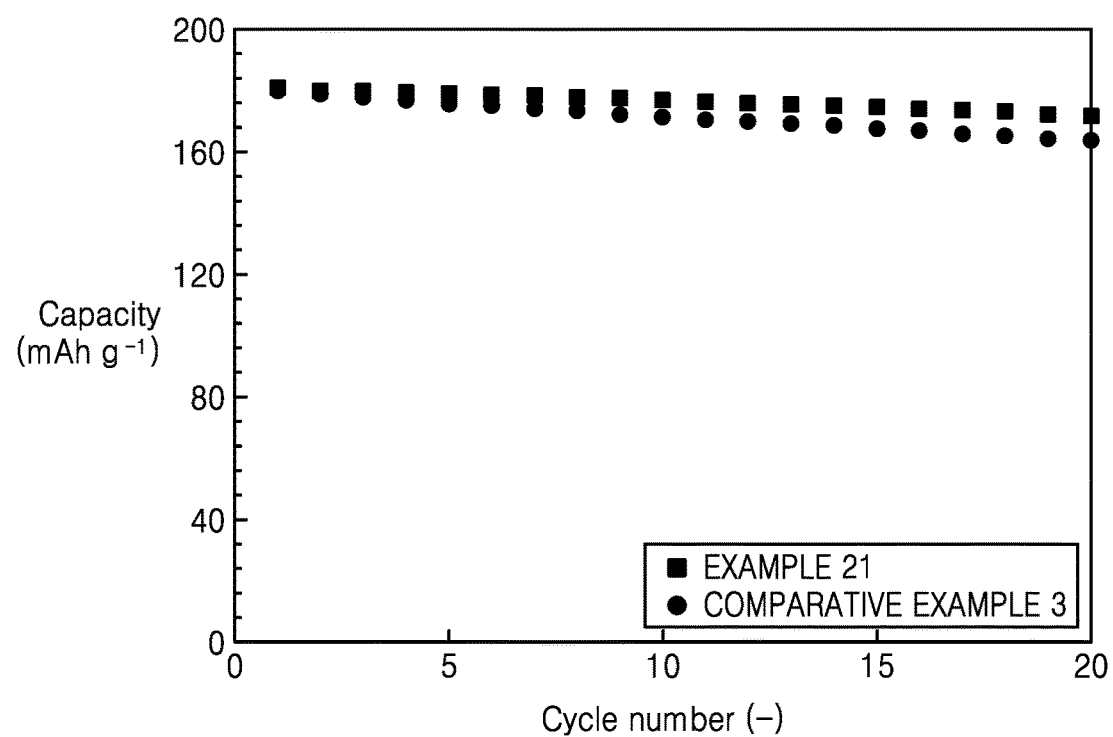
FIG. 9 is a graph of capacity (milliampere hours per gram) versus cycle number and shows evaluation results of lifespan characteristics of all-solid secondary batteries manufactured according to Example 21 and Comparative Example 3.

A process of charging with a constant current of 0.1 C until a voltage of the battery reached 4.2 V and discharging with a constant current of 0.1 C until the voltage reached 2.5 V was performed as one cycle. The cycle was repeated 20 cycles, and the results of the charging/discharging test are shown in FIG. 9. Capacity retention was calculated using Equation 2, and the results are represented in Table 2 and FIG. 9.

$$\text{Capacity retention (\%)} = [\text{Discharge capacity at } 20^{th} \text{ cycle/Discharge capacity at } 1^{st} \text{ cycle}] \times 100\% \quad \text{Equation 2}$$

TABLE 2

| | Capacity retention (%) |
|---|---|
| Example 21 | 95.0 |
| Comparative Example 3 | 91.1 |

As shown in Table 2 and FIG. 9, the all-solid state secondary battery prepared according to Example 21 had a higher capacity retention than the all-solid state secondary battery prepared according to Comparative Example 3.

As described above, according to the one or more embodiments, a solid ion conductor according to an aspect may be a halogen-based solid ion conductor with Zr having an oxidation state of +4 as a central metal and which is substituted at a Zr site or/and Li site with a lanthanide metal having an oxidation state of +3 and a crystal ionic radius of 104 pm to 109 pm or/and at least one metal of Na, K, Cs, Cu, or Ag, having an oxidization state of +1.

In addition, as compared with a halogen-based solid ion conductor with a metal having an oxidation state of +3 as a central element, for example, Li$_3$(M1)X$_6$ (wherein M1 is a metal having an oxidation state of +3), the solid ion conductor according to the one or more embodiments may have increased mobility of lithium ions and reduced activation energy, due to the possible presence of lithium vacancies between layers, and also excellent ionic conductivity.

When the solid ion conductor is used in an electrochemical device, the electrochemical device may have excellent discharge capacity and lifespan characteristics.

The solid ion conductor may be included in an electrochemical device, for example, in a solid electrolyte layer, a positive electrode layer, a negative electrode layer, a protective film on the positive electrode layer, or a protective film on the negative electrode layer of an all-solid state secondary battery or a metal air battery.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid ion conductor comprising one or more compounds having a distorted rock-salt type structure represented by Formula 2 or Formula 3:

$$Li_{2+x}M'_xZr_{1-x}X_y \quad \text{Formula 2}$$

wherein in Formula 2,
M' is one or more of lanthanide metals having an oxidation state of +3 and a crystal ionic radius of about 104 picometers to about 109 picometers,
X is one or more halogen elements,
0<x<1, and 0<y<7, $$Li_{p-q}M_qM'_rZr_{1-r}X_w \quad \text{Formula 3}$$

wherein in Formula 3,
M is one or more metals of Na, K, Cs, Cu, or Ag, and having an oxidation state of +1,
M' is one or more lanthanide metals having an oxidation state of +3 and a crystal ionic radius of about 104 picometers to about 109 picometers,
X is one or more halogen elements,
1<p<3, 0≤q<1, 0<r<1, and 0<w<7.

2. The solid ion conductor of claim 1, wherein
M' has an oxidation state of +3 and is one or more of Ho, Dy, Tb, Eu, or Gd,
X in Formula 2 or Formula 3 is one or more of Cl or Br.

3. The solid ion conductor of claim 1, wherein the compound comprises one or more of
$Li_{2.7}Ho_{0.7}Zr_{0.3}Cl_6$, $Li_{2.5}Ho_{0.5}Zr_{0.5}Cl_6$,
$Li_{2.3}Ho_{0.3}Zr_{0.7}Cl_6$, $Li_{2.25}Ho_{0.25}Zr_{0.75}Cl_6$,
$Li_{2.2}Ho_{0.2}Zr_{0.8}Cl_6$, $Li_{2.15}Ho_{0.15}Zr_{0.85}Cl_6$,
$Li_{2.25}Ho_{0.05}Zr_{0.9}Cl_6$, $Li_{2.1}Ho_{0.1}Zr_{0.9}Cl_6$,
$Li_{2.05}Ho_{0.05}Zr_{0.95}Cl_6$, $Li_2Na_{0.1}Ho_{0.1}Zr_{0.9}Cl_6$;
$Li_{2.7}Dy_{0.7}Zr_{0.3}Cl_6$, $Li_{2.5}Dy_{0.5}Zr_{0.5}Cl_6$,
$Li_{2.3}Dy_{0.3}Zr_{0.7}Cl_6$, $Li_{2.25}Dy_{0.25}Zr_{0.75}Cl_6$,
$Li_{2.2}Dy_{0.2}Zr_{0.8}Cl_6$, $Li_{2.15}Dy_{0.15}Zr_{0.85}Cl_6$,
$Li_{2.25}Dy_{0.05}Zr_{0.9}Cl_6$, $Li_{2.1}Dy_{0.1}Zr_{0.9}Cl_6$,
$Li_{2.05}Dy_{0.05}Zr_{0.95}Cl_6$;
$Li_{2.7}Tb_{0.7}Zr_{0.3}Cl_6$, $Li_{2.5}Tb_{0.5}Zr_{0.5}Cl_6$, $Li_{2.3}Tb_{0.3}Zr_{0.7}Cl_6$,
$Li_{2.25}Tb_{0.25}Zr_{0.75}Cl_6$, $Li_{2.2}Tb_{0.2}Zr_{0.8}Cl_6$,
$Li_{2.15}Tb_{0.15}Zr_{0.85}Cl_6$, $Li_{2.25}Tb_{0.05}Zr_{0.9}Cl_6$,
$Li_{2.1}Tb_{0.1}Zr_{0.9}Cl_6$, $Li_{2.05}Tb_{0.05}Zr_{0.95}Cl_6$;
$Li_{2.7}Eu_{0.7}Zr_{0.3}Cl_6$, $Li_{2.5}Eu_{0.5}Zr_{0.5}Cl_6$, $Li_{2.3}Eu_{0.3}Zr_{0.7}Cl_6$,
$Li_{2.25}Eu_{0.25}Zr_{0.75}Cl_6$, $Li_{2.2}Eu_{0.2}Zr_{0.8}Cl_6$,
$Li_{2.15}Eu_{0.15}Zr_{0.85}Cl_6$, $Li_{2.25}Eu_{0.05}Zr_{0.9}Cl_6$,
$Li_{2.1}Eu_{0.1}Zr_{0.9}Cl_6$, $Li_{2.05}Eu_{0.05}Zr_{0.95}Cl_6$; or
$Li_{2.7}Gd_{0.7}Zr_{0.3}Cl_6$, $Li_{2.5}Gd_{0.5}Zr_{0.5}Cl_6$,
$Li_{2.3}Gd_{0.3}Zr_{0.7}Cl_6$, $Li_{2.25}Gd_{0.25}Zr_{0.75}Cl_6$,
$Li_{2.2}Gd_{0.2}Zr_{0.8}Cl_6$, $Li_{2.15}Gd_{0.15}Zr_{0.85}Cl_6$,
$Li_{2.25}Gd_{0.05}Zr_{0.9}Cl_6$, or $Li_{2.1}Gd_{0.1}Zr_{0.9}Cl_6$,
$Li_{2.05}Gd_{0.05}Zr_{0.95}Cl_6$.

4. The solid ion conductor of claim 1, wherein the compound has a crystal structure belonging to a P3m1 space group or a P3m1-like space group.

5. The solid ion conductor of claim 1, wherein
the compound represented by Formula 2 or Formula 3, when analyzed by X-ray diffraction using CuKα radiation, has a primary peak at a diffraction angle of about 31° 2θ to about 33° 2θ, and
secondary peaks at diffraction angle of about 15° 2θ to about 17° 2θ and about 40° 2θ to about 42° 2θ.

6. The solid ion conductor of claim 1, wherein the compound of Formula 2 or Formula 3 has a primary peak at a diffraction angle of about 31° 2θ to about 33° 2θ that is shifted to a smaller angle than a corresponding peak of a $Li_2ZrCl_6$ compound, when analyzed by X-ray diffraction using CuKα radiation.

7. The solid ion conductor of claim 1, wherein the solid ion conductor has an ionic conductivity of about $2.1 \times 10^{-4}$ siemens per centimeter or more at about 25° C.

8. The solid ion conductor of claim 1, wherein the solid ion conductor has an activation energy of about 0.27 electron volt to about 0.38 electron volt.

9. A solid electrolyte layer comprising: a layer comprising the solid ion conductor according to claim 1.

10. A solid electrolyte comprising the solid ion conductor according to claim 1 and optionally an oxide solid ion conductor or a sulfide solid ion conductor.

11. An electrochemical device comprising a positive electrode layer, a negative electrode layer, and a solid electrolyte layer disposed between the positive electrode layer and the negative electrolyte layer, wherein one or more of the positive electrode layer, the negative electrolyte layer, or the solid electrolyte layer comprises the solid ion conductor according to claim 1.

12. The electrochemical device of claim 11, further comprising a protective film on one or more of the positive electrode layer, the negative electrode layer, or solid electrolyte layer, wherein the protective film comprises the solid ion conductor.

13. The electrochemical device of claim 11, wherein the positive electrode layer comprises one or more of a positive active material of a lithium transition metal oxide, a lithium transition metal phosphate, or a sulfide, and the solid ion conductor.

14. The electrochemical device of claim 11, wherein the solid electrolyte layer comprises the solid ion conductor.

15. The electrochemical device of claim 11, wherein the electrochemical device is an all-solid state secondary battery or a metal air battery.

16. A protected positive electrode, comprising
a positive electrode; and
a protective film comprising the solid ion conductor of claim 1 on the positive electrode.

17. A protected negative electrode, comprising
a negative electrode; and
a protective film comprising the solid ion conductor of claim 1 on the negative electrode.

18. A method of preparing a solid ion conductor, the method comprising: mechanically milling a solid ion conductor-forming precursor to form a solid ion conductor-forming precursor mixture; and
molding the solid ion conductor-forming precursor mixture to prepare a solid ion conductor comprising a compound having a distorted rock-salt type structure represented by Formula 2 or Formula 3:

$$Li_{2+x}M'_xZr_{1-x}X_y \quad \text{Formula 2}$$

wherein in Formula 2,
M' is one or more of lanthanide metals having an oxidation state of +3 and a crystal ionic radius of about 104 picometers to about 109 picometers,
X is one or more halogen elements,
0<x<1, and 0<y<7, $$Li_{p-q}M_qM'_rZr_{1-r}X_w \quad \text{Formula 3}$$

wherein in Formula 3,

M is one or more metals of Na, K, Cs, Cu, or Ag, and having an oxidation state of +1, M' is one or more lanthanide metals having an oxidation state of +3 and a crystal ionic radius of about 104 picometers to about 109 picometers, X is one or more halogen elements, $1<p<3$, $0\leq q<1$, $0<r<1$, and $0<w<7$.

19. The method of claim 18, wherein the mechanical milling comprises one or more of ball milling, air-jet milling, bead milling, roll milling, planetary milling, hand milling, high-energy ball milling, stirred ball milling, vibrating milling, mechanofusion milling, shaker milling, attritor milling, disk milling, shape milling, nauta milling, nobilta milling, or high-speed mixing.

20. The method of claim 18, wherein the mechanical milling is planetary milling and is performed at room temperature.

21. The method of claim 18, further comprising, after the mechanically milling, conditioning the solid ion conductor-forming precursor mixture.

\* \* \* \* \*